United States Patent [19]

Palazzolo

[11] Patent Number: 5,103,757
[45] Date of Patent: Apr. 14, 1992

[54] SELF CLEANING DEVICE FOR SIGHT FLOW INDICATORS

[75] Inventor: Daniel P. Palazzolo, Michigan City, Ind.

[73] Assignee: Dwyer Instruments, Inc., Michigan City, Ind.

[21] Appl. No.: 657,480

[22] Filed: Feb. 19, 1991

[51] Int. Cl.⁵ ............................................. G01F 15/12
[52] U.S. Cl. .................... 116/276; 73/861.75
[58] Field of Search ............ 73/324, 861.75, 198; 116/264, 112, 276

[56] References Cited

U.S. PATENT DOCUMENTS 2,648,857  8/1953  Kelly et al. .................. 73/324 X
4,037,471  7/1977  Okamoto et al. ............. 15/250.36

OTHER PUBLICATIONS

Kobold 1990 Catalog (in loose leaf form), five sheets selected and submitted herewith, said Kobold 1990 Catalog received by Dwyer Instruments, Inc. (Applicant's employer), Jul. 1990.

Primary Examiner—Daniel M. Yasich
Attorney, Agent, or Firm—Lee, Mann, Smith, McWilliams, Sweeney & Ohlson

[57] ABSTRACT

A self cleaning device for rotatable sight glass equipped visual flow indicators (for visually indicating fluid flow therethrough) that includes several stationary wiper implements that each include a wiper holder fixedly mounting a wiper in the form of a tube of compressible material that is in compressed wiping engagement with the inside surfacing of the sight glass, for improved wiping away of foreign materials when the sight glass is rotated for this purpose.

2 Claims, 2 Drawing Sheets

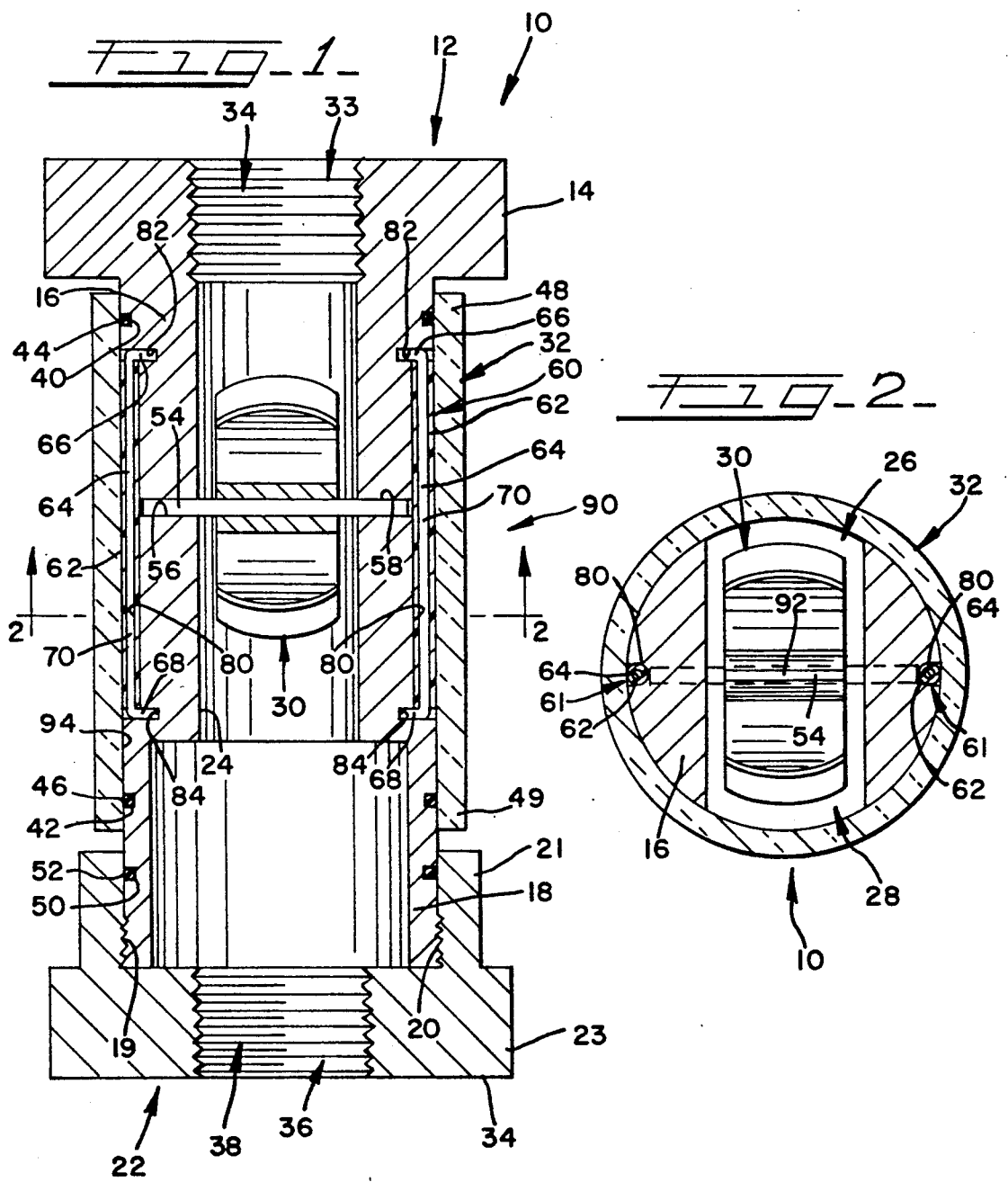

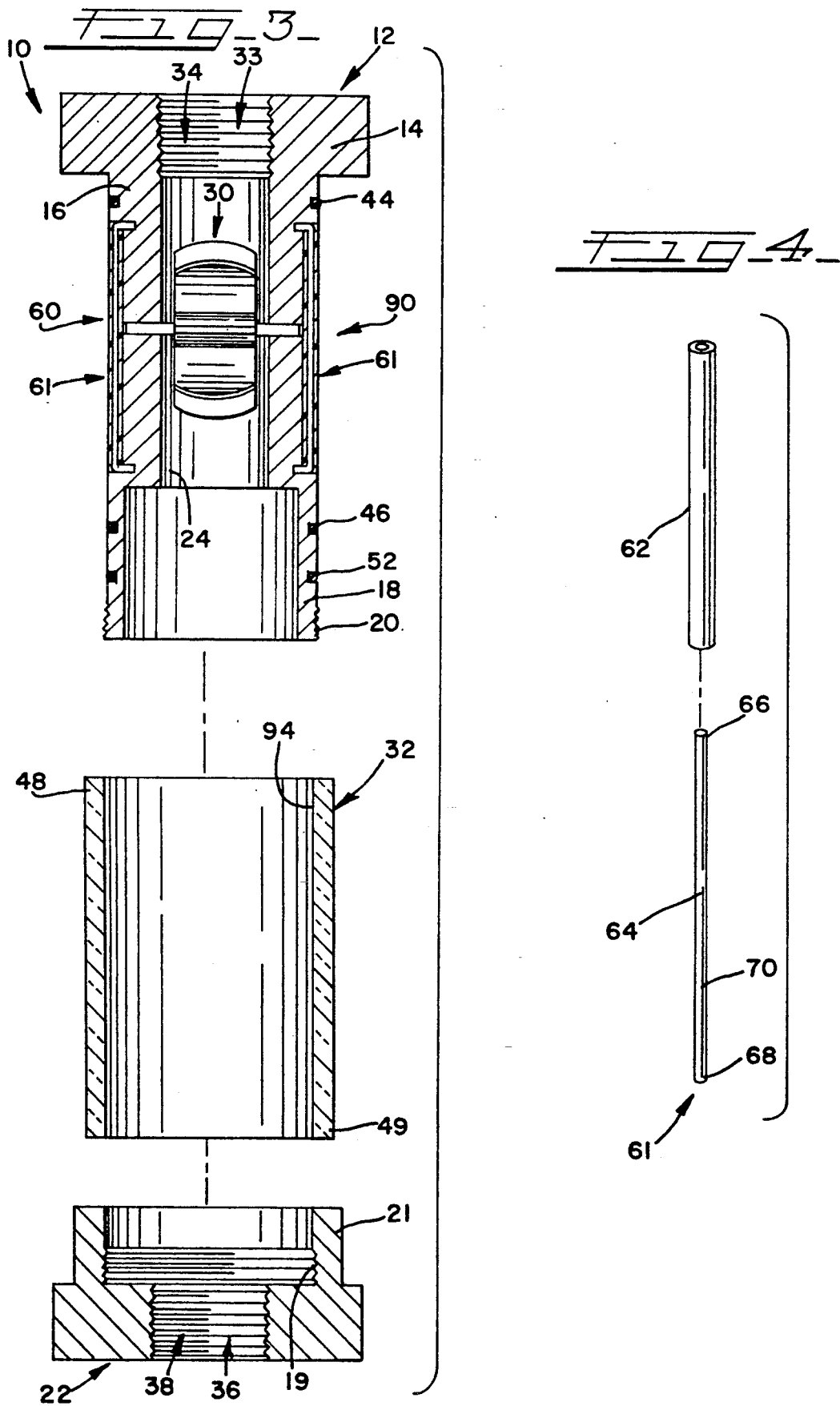

SELF CLEANING DEVICE FOR SIGHT FLOW INDICATORS

The present invention is directed to a self cleaning device and method employed in making same for rotatable sight glass equipped visual flow indicators, and more particularly, to a self cleaning device for visual flow indicators that employs fixed and compressible wiping elements that are in compressed relation against the internal or inside surface of the visual flow indicator sight glass for internally cleaning same from accumulated foreign material, such as dirt, that builds up during use of the flow indicator (for visual flow of a fluid therethrough) that otherwise would tend to interfere with the visibility of the indicator rotor.

Visual flow indicators, such as the DAA unit offered by Kobold Instruments, Inc., of Pittsburgh, Pa., are commonly employed in piping for supplying liquids and gases from a source thereof to equipment operated thereby or processing equipment therefor, to provide a visual indication that fluid flow is actually taking place when the fluid is to pass through the piping. Devices of this type generally comprise a short tubular casing defining opposed window openings that expose for viewing a rotor journalled in the casing for rotation when the fluid to be supplied therethrough passes therethrough, with a generally cylindrical sight glass journalled in a fluid sealed manner on the casing about the casing window openings for viewing of the rotor from exteriorly of the indicator. Where the indicator is of single flow direction in function, the indicator casing adjacent its rotor and sight glass mounting end is formed with the usual hex or other similar configuration for defining the outlet of the indicator, and the other end of the indicator casing is equipped with a nut device of the usual hex or other similar configuration that is physically isolated from the sight glass and is in suitable fluid sealing relation to the indicator casing, and forms the inlet to the indicator, for incorporating the indicator in the piping so that the gas or liquid conveyed by the piping moves linearly through the indicator. When fluid flows through the piping and its indicator, the fluid flow is visually observable by looking through the sight glass for the rotation of the indicator rotor.

However, foreign material, such as dirt, tends to build up on the inside surfacing of the sight glass over a period of time of use in monitoring fluid flow, and this build up interferes with observation of the indicator rotor through the indicator sight glass and the casing window openings covered thereby. The Kobold indicator referred to attempts to deal with this problem by incorporating in its indicator a pair of rotatable Teflon wipers that engage the inside surfacing of the sight glass when the sight glass is rotated relative to the indicator casing.

A principal object of the present invention is to provide a sight glass cleaning device for sight glass equipped visual flow indicators that effectively clears the sight glass of, for instance, dirt build ups during the course of use of same to monitor fluid flow, in a self acting manner by moving the sight glass relative to the indicator casing.

Another principal object of the present invention is to provide, as part of the indicator, a cleaning device for cleaning the interior surfacing of the indicator sight glass, in the form of a wiper implement fixed to the indicator casing that includes a compressible wiper element in engagement with the interior surfacing of the sight glass, whereby the sight glass interior surface can be cleaned by moving the sight glass relative to the indicator casing.

A further principal object of the present invention is to provide, as part of the indicator, a self cleaning device for cleaning the interior surfacing of the sight glass, in the form of several wiper implements fixed to the indicator casing in which such wiper implements each have fixed thereto a tubular wiper element that is formed from compressible material and that is compressed between the sight glass interior surfacing and the casing for effecting wiping action, and thus cleaning of, the sight glass interior surfacing, when the sight glass is rotated relative to the indicator casing.

In accordance with the present invention, a cleaning device is provided, for visual flow indicators of the type indicated, in which the wiper implements involved each comprise a wiper holder in the form of a rod formed from stainless steel or the like that fixedly mounts a tube of compressible material thereon, with the ends of the wiper holders being anchored on the indicator casing and positioned so that each wiper holder extends parallel to the central axis of the indicator casing so as to dispose the wiper implements themselves in like parallelism to the central axis of the indicator casing, and thus of the sight glass, with the wiper elements themselves being formed from polyolefin for ready heat shrunk fixing to the respective holders and proportioned for a compression fit against the sight glass interior surfacing when the indicator parts are assembled, for effective wiping of the sight glass interior surfacing when it is to be cleaned to maintain effective visibility of the indicator rotor.

Further in accordance with this invention, a novel but simple method of heat shrinking the individual wiper elements on their holders, for fixing the respective tubes to their holders, is employed.

Other objects, uses, and advantages will be obvious or become apparent from a consideration of the following detailed description and the application drawings in which like reference numerals indicate like parts throughout the several views.

In the drawings:

FIG. 1 is a longitudinal sectional view through a conventional visual flow indicator of the type indicated (conventionally arranged for one direction of fluid flow therethrough), showing the general arrangement involved, and illustrating one embodiment of the Applicant's self cleaning device applied thereto;

FIG. 2 is a transverse sectional view taken substantially along line 2—2 of FIG. 1, looking in the direction of the arrows, and thus looking at the indicator rotor that is visible through the indicator window openings through the sight glass that is shown in transverse section in FIG. 2, showing the Applicant's sight glass cleaning implements in section;

FIG. 3 is an exploded illustration of the embodiment of FIG. 1, shown on a reduced scale for illustrative purposes; and, FIG. 4 is a perspective view diagrammatically illustrating the nature of the wiper implements employed in connection with the present invention.

However, it is to be distinctly understood that the drawing illustrations referred to are provided primarily to comply with the disclosure requirements of the Patent Laws, and that the invention is susceptible of modifications and variations that will be obvious to those skilled in the art, and that are intended to be covered by the appended claims.

Reference numeral 10 of FIGS. 1-3 of the drawings illustrates a visual flow indicator equipped for self cleaning purposes in accordance with the present invention.

The indicator 10 comprises a casing 12 having the usual head 14 and shank 16, the end 18 of which is externally threaded as at 20 for threaded application to internal threading 19 of short shank 21 of nut 22 that also has the usual head 23. The indicator casing 12 is formed with a longitudinally extending bore 24 that is coextensive with the customary window openings 26 and 28 that the casing defines for viewing rotor 30 through the cylindrical sight glass 32 that is of the usual well-known cylindrical configuration made of a suitable glass material, such as that sold under the trademark DURAN or its equivalent, to avoid damage thereto during application of the indicator to the piping involved and use of same when the fluid flow is to move through the piping and thus actuate the rotor 30 for visual observance exteriorly of the device 10.

For application purposes, the head 14 of the casing 12 is apertured as at 33 and defines internal threading 34 to form the outlet of the indicator 10 and threadedly engage the downstream segment of the piping involved, while the nut head 23 is apertured as at 36 and defines internal threading 38 for forming the intake end of the indicator 10 and threadedly receive the upstream piping segment, all in a manner well-known to the art. The heads 14 and 23 may be of the familiar hex configuration or other suitable configuration for application of the respective indicator components involved to the upstream and downstream components of the piping (not shown) as is well-known in the art.

As indicated in the showing of FIGS. 1 and 3, the casing shank 12 is formed with spaced grooves 40 and 42 to receive the respective conventional 0 ring seals 44 and 46 for suitable fluid sealing relation engagement with the end portions 48 and 49 of the sight glass 32.

As is well known in the art, the sight glass 32 is a cylinder of a suitable glass of the type indicated, and is proportioned relative to the casing shank 16 to slidably receive same and be in fluid tight sealing relation with the respective seals 44 and 46.

The end 18 of the casing shank 16 is formed with a similar groove 50 receiving suitable 0 ring seal 52 for suitably sealing the nut 22 with respect to the casing shank 16, when the nut 22 is threaded onto the shank end 18 at its external threading 20 when the indicator device per se is assembled.

The rotor 30 prior to assembly of the device 10 is journalled on suitable pin 54 press fitted or the like into cross apertures 56 and 58 of the shank 16 for ready rotational movement when a liquid or gas passes through the bore 24 whereby the rotating motion of the rotor 30 is visible through the sight glass 32 to indicate that fluid is moving through the device 10.

In accordance with the present invention, the indicator sight glass self cleaning device 60 comprises, in the form illustrated, several cleaning implements 61 of the general form shown in FIG. 4 in which, for each implement 61, a wiper element 62 in the form of a tubular length of polyolefin is applied to holder 64, that is in the form of a rod formed from stainless steel or the like. In accordance with the present invention, for each implement 61, as part of the processing of the respective implements 61, the polyolefin tubes 62 are first applied to the rod 64, and then heat shrunk to fix the tube 62 to the rod 64. The polyolefin material is found to shrink when heated to approximately its melting point at approximately 239 degrees F. so that for each implement 61, the tube 62 thereof is fully fixed with respect to its holder 64, and cannot move with respect thereto, or, in other words, the tube 62 is permanently fixed to its holder 64.

After the individual tubes 62 have been applied to and affixed to the respective rods 64 in centered relation therewith, the projecting end portions 66 and 68 of the rod 64 are angled at 90 degrees in the same direction with respect to the main body 70 of the respective rods. The implements 61 are preferably proportioned as indicated in FIGS. 1 and 3 to be of equal lengths and extend longitudinally of the sight glass 32 a distance that will permit continued observation of the rotor 30, when the implements 61 serve their wiping purpose.

In the form of FIGS. 1 and 3, two such implements 61 are employed, and for each implement 61, the casing shank 16 is formed with like apertures 82 and 84 and a longitudinally extending groove or slot 80 that extends between the like apertures 82 and 84, the latter being provided for receiving the respective angled end portions 66 and 68 of the respective holders 64.

As indicated in FIGS. 1 and 3, the respective sets of grooves or slot 80 and holes 82, 84 are applied to the casing shank 16 so as to be positioned at the level of viewing site 90 of the indicator 10, and as indicated in FIG. 2, the respective grooves or slots 80 are formed on the casing shank 16 so as to be oppositely disposed (and thus are 180 degrees apart) and lie in a plane that includes the transverse rotating axis of the rotor 30 and the longitudinal axis 92 of the casing shank 16 and thus the indicator 10 (see FIG. 2).

The respective wiper implements 61 are applied to the respective sets of grooves or slots 80 and their respective oppositely disposed apertures 82 and 84 in the manner indicated in FIGS. 1 and 3, with such right angled end portions 66 and 68 projecting into the respective apertures 82 and 84 that anchor same to the indicator casing 12, but without binding engagement therewith.

An important feature of the invention is that the respective tubes 62 are proportioned so that when they are heat shrunk to be fixedly connected to the respective holder rods 70, and the implements 61 are applied to the respective recesses 80 in the manner indicated in FIGS. 1 and 2, when the sight glass 32 is applied to its operative position shown in FIG. 1, the respective tubes 62 will be compressed against the respective recesses defined by grooves or slots 80 and the interior surfacing 94 of the sight glass 32, in much the same manner that the sight glass 32 is made fluid tight by its compression of the respective ring seals 44 and 46 at its end portions 48 and 49.

The result is that when the internal surfacing 94 of the sight glass 32 becomes clouded with foreign material, such as dirt, over periods of time of use of the indicator 10 as such, the internal surface 94 of the sight glass 32 may be cleaned off by rotating it relative to the casing 12, as needed. The compression of the respective wiper implement tubes 62 along the length thereof, which is the length of their engagement with the sight glass internal surfacing 94, and the fixed relation that the respective tubes 62 have with respect to their respective holder rods 64, coupled with the anchoring of the respective holder rods 70 to the casing 12 that is provided for, insures efficient cleaning of the sight glass interior surfacing 94 as the sight glass 32 is rotated relative to the casing 12.

In the showing of FIG. 3, the relation of the respective wiping implements 61 to the indicator shank 12 is the same as that shown in FIG. 1 since FIG. 3 is a reduced scale exploded view of what is shown in FIG. 1.

While the specific sight flow indicator 10 illustrated in the drawings is of the one direction of flow type, the invention is fully applicable to bilateral flow indicators, as will be apparent to those skilled in the art.

While the O ring seals 44, 46 and 52 are disclosed as being conventional, the materials from which they are made should be chemically resistant, and also be resistant to high temperatures; a fluorcarbon rubber is preferred.

It will also be apparent that for purposes of assembling an indicator 10 or its bilateral flow equivalent, the ends 66 and 68 of the tube 62 may be made cone shaped or the like to facilitate application of the sight glass 32 to the stem 16 of casing 12.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a visual fluid flow indicator that includes a tubular casing defining an elongate bore having a central axis extending longitudinally thereof, and a flow indicator viewing site intermediate the ends of the casing that includes opposing window openings formed in the casing on either side of the bore at the level of the viewing site, a rotor journalled in the bore between the window openings for rotation about an axis that is disposed normally of said bore axis, a transparent cylindrical window pane defining opposite end portions mounted for rotatable movement about the rotor and the casing central axis at the level of the viewing site, with the window pane defining an interior side that is substantially centered on the casing, means for maintaining a fluid tight seal relation between the window pane end portions and the casing, and including a cleaning device for self cleaning of the interior side of the window panel on such rotation of the panel that includes a pair of wiper bars anchored to the casing at the level of the viewing site, with the wiper bars extending substantially parallel to the central axis of the bore and being respectively located between the window openings, and each of the wiper bars mounting a tubular wiper member thereon that is in engagement with the interior side of the pane, the improvement wherein:

the wiper members are formed from compressible material, and the casing is recessed at the respective wiper bars to seat the respective wiper members thereagainst for the length of the respective wiper members, with said wiper members along the lengths thereof being respectively compressed between the casing respective said recesses thereof and the interior side of the pane, and including means for permanently fixing the respective wiper members fast to the respective wiper bars to prevent any rotation of the respective wiper members about the respective wiper bars when the pane is rotated relative to the casing central axis and about the rotor for self-cleaning of the pane interior side.

2. The improvement set forth in claim 1 wherein:

said wiper members are respectively proportioned lengthwise thereof to have lengths that extend both upstream and downstream of the indicator beyond the rotor axially of the casing.

* * * * *